(12) United States Patent
Du et al.

(10) Patent No.: US 9,656,609 B2
(45) Date of Patent: May 23, 2017

(54) VEHICLE STEP APPARATUS AND MOTOR ASSEMBLY THEREOF

(71) Applicant: T-MAX (HANGZHOU) INDUSTRIAL CO., LTD, Hangzhou (CN)

(72) Inventors: Xinfa Du, Zhejiang (CN); Qi Zhang, Hangzhou (CN); Yiming Wang, Hangzhou (CN)

(73) Assignee: T-MAX (HANGZHOU) INDUSTRIAL CO., LTD, Hangzhou (CN)

( * ) Notice: Subject to any disclaimer, the term of this patent is extended or adjusted under 35 U.S.C. 154(b) by 0 days.

(21) Appl. No.: 15/220,503

(22) Filed: Jul. 27, 2016

(65) Prior Publication Data

US 2017/0036608 A1  Feb. 9, 2017

(30) Foreign Application Priority Data

| Aug. 4, 2015 | (CN) | 2015 1 0468824 |
| Aug. 4, 2015 | (CN) | 2015 1 0469324 |
| Aug. 4, 2015 | (CN) | 2015 2 0576675 U |
| Aug. 4, 2015 | (CN) | 2015 2 0580148 U |
| Dec. 21, 2015 | (CN) | 2015 1 0962062 |
| Dec. 21, 2015 | (CN) | 2015 2 1076768 U |

(51) Int. Cl.
*B60R 3/02* (2006.01)
*F16H 19/00* (2006.01)
*F16H 37/12* (2006.01)

(52) U.S. Cl.
CPC ............ *B60R 3/02* (2013.01); *F16H 19/001* (2013.01); *F16H 37/12* (2013.01)

(58) Field of Classification Search
CPC ............ B60R 3/02; B60R 3/002; B60D 7/00
See application file for complete search history.

(56) References Cited

U.S. PATENT DOCUMENTS

| 8,146,935 | B1 * | 4/2012 | Adams | B60R 3/02 280/164.1 |
| 8,297,635 | B2 * | 10/2012 | Agoncillo | B60R 3/02 280/163 |
| 8,662,512 | B2 * | 3/2014 | May | B60R 3/02 280/163 |

* cited by examiner

*Primary Examiner* — John Walters
*Assistant Examiner* — James Triggs
(74) *Attorney, Agent, or Firm* — Howard & Howard Attorneys PLLC

(57) ABSTRACT

A vehicle step apparatus including an extending and retracting device having a mounting bracket, a step bracket, and an arm assembly. A gear box has a cavity into which at least a portion of a motor shaft of a motor is inserted. A worm wheel is rotatably disposed in the cavity and has a worm wheel body meshing with the motor shaft. An output shaft is mounted to the worm wheel body. A sun gear is fitted over the output shaft. A planet carrier is rotatably disposed in the cavity and connected with the arm assembly. A planet gear is rotatably mounted to the planet carrier and meshes with the sun gear. An adjusting member is mounted in the gear box, and is movable in an axial direction of the motor shaft and abuts against a free end of the motor shaft.

12 Claims, 5 Drawing Sheets

VEHICLE STEP APPARATUS AND MOTOR ASSEMBLY THEREOF

RELATED APPLICATIONS

This application claims priority and benefits of Chinese Patent Application No. 201510469324.4, filed with State Intellectual Property Office on Aug. 4, 2015, Chinese Patent Application No. 201520580148.7, filed with State Intellectual Property Office on Aug. 4, 2015, Chinese Patent Application No. 201510468824.6, filed with State Intellectual Property Office on Aug. 4, 2015, Chinese Patent Application No. 201520576675.0, filed with State Intellectual Property Office on Aug. 4, 2015, Chinese Patent Application No. 201510962062.5, filed with State Intellectual Property Office on Dec. 21, 2015, and Chinese Patent Application No. 201521076768.3, filed with State Intellectual Property Office on Dec. 21, 2015, the entire contents of which are incorporated herein by reference.

BACKGROUND OF THE INVENTION

1. Field of the Invention

Embodiments of the present invention generally relate to a field of vehicle technology, and more particularly, to a vehicle step apparatus and a motor assembly thereof.

2. Description of the Related Art

A vehicle step apparatus mounted on a chassis of a vehicle is used to assist passengers to get on or off the vehicle. An extending and retracting device of the vehicle step apparatus is driven by a motor via a reducing mechanism. Because a mounting space of the vehicle step apparatus is limited, it is required that the vehicle step apparatus has a small size. There are two kinds of reducing mechanisms for the current vehicle step apparatus.

The first kind of reducing mechanism is a combination of a worm-and-worm wheel reducing mechanism and a cylindrical gear reducing mechanism. The first kind of reducing mechanism has defects of a low protection level and a large size, and thus is difficult to be mounted on a vehicle body.

The second kind of reducing mechanism is a combination of a worm-and-worm wheel reducing mechanism and another worm-and-worm wheel reducing mechanism. The second kind of reducing mechanism has defects of a high manufacture cost and a large size, and thus is difficult to be manufactured and to be mounted on the vehicle body.

Moreover, because a worm of the reducing mechanism has a great axial force, an axial gap of the worm increases after a period of usage and due to abrasion caused therein, so that the transmission efficiency is decreased, and the noise during reversal is increased.

SUMMARY OF THE INVENTION

The present invention seeks to solve at least one of the technical problems existing in the related art. Therefore, embodiments of the present invention provide a vehicle step apparatus. The vehicle step apparatus according to embodiments of the present invention has advantages of high transmission efficiency, low noise during reversal, a compact structure, and a small size.

Embodiments of a first aspect of the present invention provide a vehicle step apparatus. The vehicle step apparatus includes an extending and retracting device comprising a mounting bracket, a step bracket, and an arm assembly connected between the mounting bracket and the step bracket to drive the step bracket to move between an extending position and a retracting position. A step is mounted on the step bracket and a motor has a motor shaft including a worm. A gear box defines a cavity therein. At least a portion of the motor shaft is inserted into the cavity. A worm wheel is rotatably disposed in the cavity, and includes a worm wheel body meshing with the motor shaft and an output shaft mounted to the worm wheel body. A sun gear is fitted over the output shaft. A planet carrier is rotatably disposed in the cavity and connected with the arm assembly to drive the arm assembly. A planet gear is rotatably mounted to the planet carrier and meshes with the sun gear. An adjusting member is mounted in the gear box, and is movable in an axial direction of the motor shaft and abuts against a free end of the motor shaft.

Embodiments of a second aspect of the present invention provide a motor assembly of a vehicle step apparatus. The motor assembly of a vehicle step apparatus includes a motor having a motor shaft including a worm. A gear box defines a cavity therein. At least a portion of the motor shaft is inserted into the cavity. A worm wheel is rotatably disposed in the cavity, and has a worm wheel body meshing with the motor shaft, and an output shaft mounted to the worm wheel body. A sun gear is fitted over the output shaft. A planet carrier is rotatably disposed in the cavity and connected with the arm assembly to drive the arm assembly. A planet gear is rotatably mounted to the planet carrier and meshes with the sun gear. An adjusting member is mounted in the gear box, and is movable in an axial direction of the motor shaft and abuts against a free end of the motor shaft.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
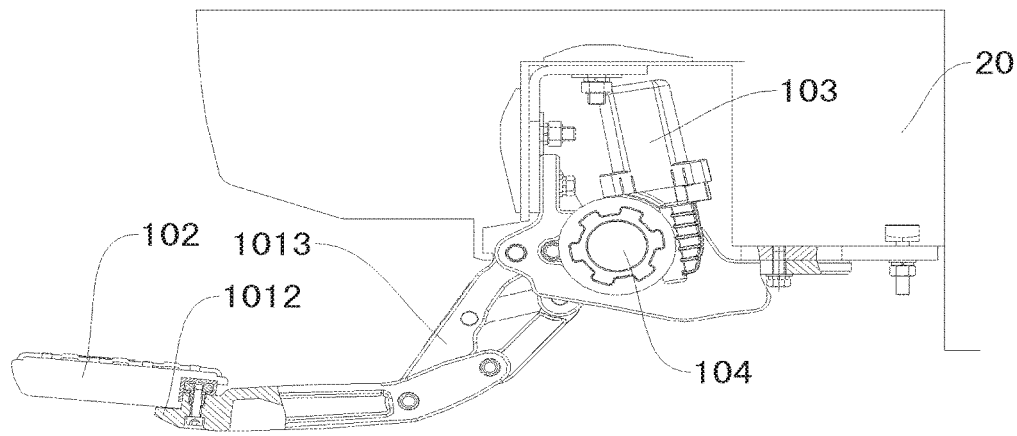
FIG. 1 is a schematic view of a vehicle step apparatus according to an embodiment of the present invention, in which a step bracket is in an extending position.
Figure 2:
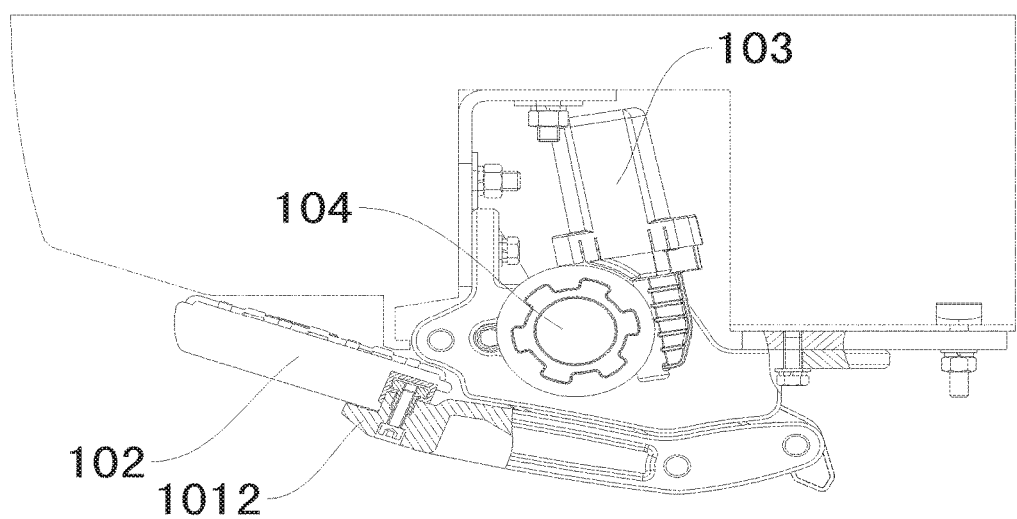
FIG. 2 is a schematic view of a vehicle step apparatus according to an embodiment of the present invention, in which a step bracket is in a retracting position.
Figure 3:
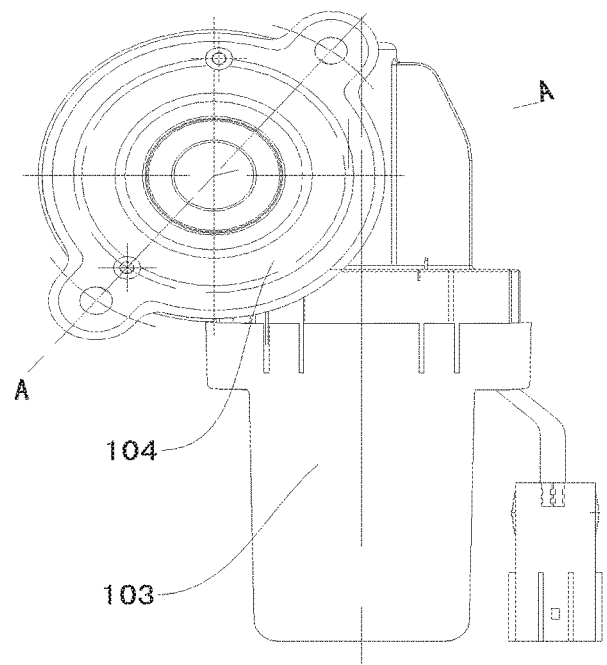
FIG. 3 is a schematic view of a motor assembly of a vehicle step apparatus according to an embodiment of the present invention.

Reference will be made in detail to embodiments of the present invention. Embodiments of the present invention will be shown in drawings, in which the same or similar members and the members having same or similar functions are denoted by like reference numerals throughout the descriptions. The embodiments described herein according to drawings are explanatory and illustrative, not construed to limit the present invention.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom", "inner", "outer", "clockwise", "anticlockwise", "axial", "radial", "circumferential" as well as derivative thereof (e.g., "horizontally", "downwardly", "upwardly", etc.) should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance. Thus, features limited by "first" and "second" are intended to indicate or imply including one or more than one these features. In the description of the present invention, "a plurality of" relates to two or more than two.

In the description of the present invention, unless specified or limited otherwise, it should be noted that, terms "mounted", "connected" and "coupled" may be understood broadly, such as permanent connection or detachable connection, electronic connection or mechanical connection, direct connection or indirect connection via intermediary, inner communication or interreaction between two elements. These having ordinary skills in the art should understand the specific meanings in the present invention according to specific situations.

In the description of the present invention, a structure in which a first feature is "on" a second feature may include an embodiment in which the first feature directly contacts the second feature, and may also include an embodiment in which an additional feature is formed between the first feature and the second feature so that the first feature does not directly contact the second feature, unless otherwise specified. Furthermore, a first feature "on", "above" or "on top of" a second feature may include an embodiment in which the first feature is right "on," "above", or "on top of" the second feature, and may also include an embodiment in which the first feature is not right "on", "above", or "on top of" the second feature, or just means that the first feature has a sea level elevation larger than the sea level elevation of the second feature. While first feature "beneath", "below" or "on bottom of" a second feature may include an embodiment in which the first feature is right "beneath", "below" or "on bottom of" the second feature, and may also include an embodiment in which the first feature is not right "beneath", "below" or "on bottom of" the second feature, or just means that the first feature has a sea level elevation smaller than the sea level elevation of the second feature.

A vehicle step apparatus 10 according to embodiments of the present invention will be described with reference to the drawings.

As shown in FIG. 1 to FIG. 10, the vehicle step apparatus 10 according to embodiments of the present invention includes an extending and retracting device 101, a step 102, a motor 103, a gear box 104, a worm wheel 105, a sun gear 1061, a planet carrier 1062, a planet gear 1063 and an adjusting member 107.

The extending and retracting device 101 includes a mounting bracket 1011, a step bracket 1012 and an arm assembly 1013. The arm assembly 1013 is connected between the mounting bracket 1011 and the step bracket 1012, and drives the step bracket 1012 to move between an extending position and a retracting position. The step 102 is mounted on the step bracket 1012.

The motor 103 has a motor shaft 1031 configured as a worm. In other words, a helical tooth is formed in at least a portion of the motor shaft 1031. The gear box 104 has a cavity 1041 therein, and at least a portion of the motor shaft 1031 is inserted into the cavity 1041. The adjusting member 107 is mounted in the gear box 104, movable in an axial direction of the motor shaft 1031 and abuts against a free end of the motor shaft 1031.

The worm wheel 105 is rotatably disposed in the cavity 1041, and includes a worm wheel body 1051 and an output shaft 1052. The worm wheel body 1051 meshes with the motor shaft 1031, and the output shaft 1052 is mounted to the worm wheel body 1051. The sun gear 1061 is fitted over the output shaft 1052.

The planet carrier 1062 is rotatably disposed in the cavity 1041 and connected with the arm assembly 1013 to drive the arm assembly 1013, further to drive the step bracket 1012 to move between the extending position and the retracting position. The planet gear 1063 is rotatably mounted to the planet carrier 1062 and meshes with the sun gear 1061.

Operations of the vehicle step apparatus 10 according to embodiments of the present invention will be described with reference to FIG. 1 to FIG. 10. When the vehicle step apparatus 10 is not used by a user, the step bracket 1012 is in the retracting position.

When the user gets on the vehicle or gets off the vehicle, the motor shaft 1031 of the motor 103 rotates clockwise (or counterclockwise), and drives the worm wheel body 1051 and the output shaft 1052 mounted to the worm wheel body 1051 to rotate. Because the sun gear 1061 is fitted over the output shaft 1052, the output shaft 1052 drives the sun gear 1061 to rotate.

The sun gear 1061, the planet gear 1063 and the planet carrier 1062 constitute a planetary gear reducing mechanism, the power is output by the planet carrier 1062. Specifically, the planet carrier 1062 is connected with the arm assembly 1013 so as to drive the step bracket 1012 to move from the retracting position to the extending position via the arm assembly 1013. That is to say, the step 102 is moved from the retracting position to the extending position, so that it is convenient for the user to get on the vehicle or get off the vehicle by treading on the step 102.

After the user gets on the vehicle or gets off the vehicle, the motor shaft 1031 of the motor 103 rotates counterclockwise (or clockwise) so as to drive the step bracket 1012 to move from the extending position to the retracting position.

The vehicle step apparatus 10 according to embodiments of the present invention has a reverse self-locking function by providing a worm-and-worm wheel mechanism, so as to protect the extending and retracting device 101.

By providing the planetary gear reducing mechanism, the vehicle step apparatus 10 according to embodiments of the present invention can achieve a desired reduction ratio, and has a smaller size and more compact structure compared with a cylindrical gear reducing mechanism and a worm-and-worm wheel reducing mechanism. Thus, the vehicle step apparatus 10 is more suitable to be mounted at a bottom of the vehicle, in which the bottom of the vehicle has a narrow space.

Moreover, because the motor shaft 1031 (i.e. a worm) of the motor 103 has a great axial force, an axial gap of the motor shaft 1031 increases after a period of usage and due to abrasion caused therein, so that the transmission efficiency is decreased, and the noise during reversal is increased.

However, in embodiments of the present invention, by providing the adjusting member 107 in the gear box 104, which is movable in the axial direction of the motor shaft 1031 and abuts against the free end of the motor shaft 1031, the axial gap of the motor shaft 1031 can be adjusted by moving the adjusting member 107 along the axial direction of the motor shaft 1031.

That is to say, the axial gap of the motor shaft 1031 can be eliminated by moving the adjusting member 107 along the axial direction of the motor shaft 1031, so as to improve the transmission efficiency and decrease the noise during reversal.

Thus, the vehicle step apparatus 10 according to embodiments of the present invention has advantages of high transmission efficiency, low noise during reversal, a compact structure, a small size, high safety, high reliability, a long working life, a low manufacture cost and so on, and is suitable to be mounted at the bottom of the vehicle, in which the bottom of the vehicle has the narrow space.

As shown in FIG. 1 to FIG. 10, in some embodiments, the vehicle step apparatus 10 includes the extending and retracting device 101, the step 102 and a motor assembly. The motor assembly includes the motor 103, the gear box 104, the worm wheel 105, the sun gear 1061, the planet carrier 1062, the planet gear 1063 and the adjusting member 107.

Figure 4:
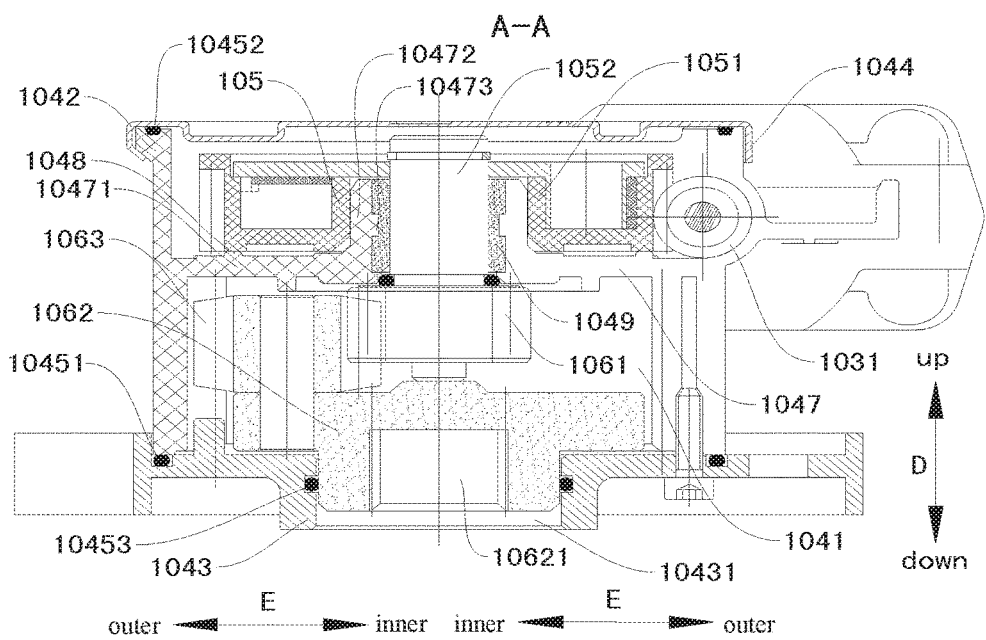
FIG. 4 is a sectional view of the motor assembly taken along line A-A in FIG. 3.
Figure 5:
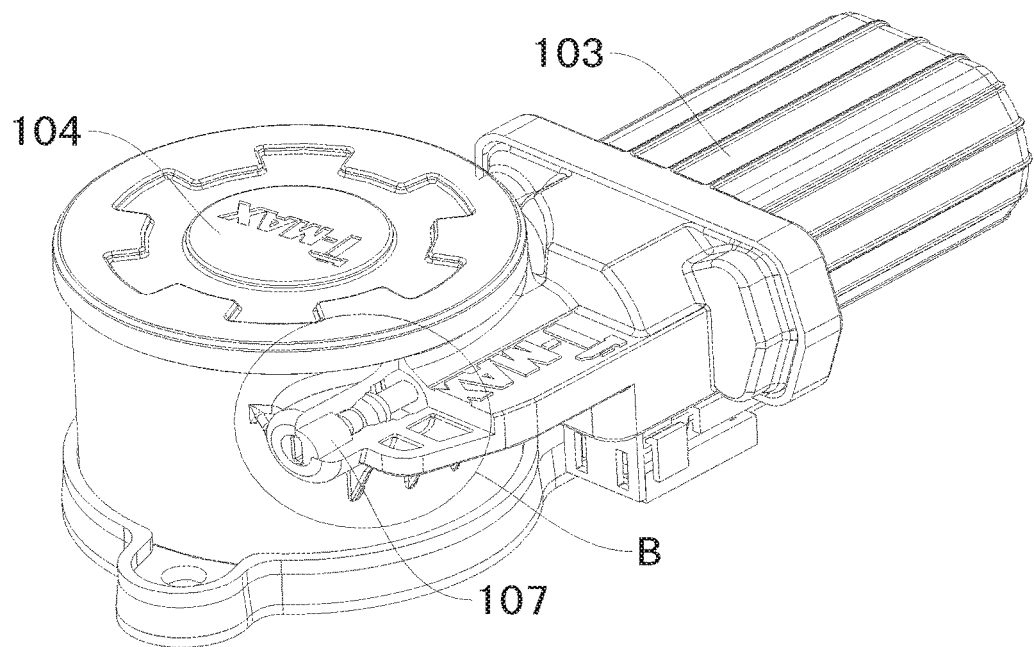
FIG. 5 is a schematic view of a motor assembly of a vehicle step apparatus according to an embodiment of the present invention.
Figure 6:
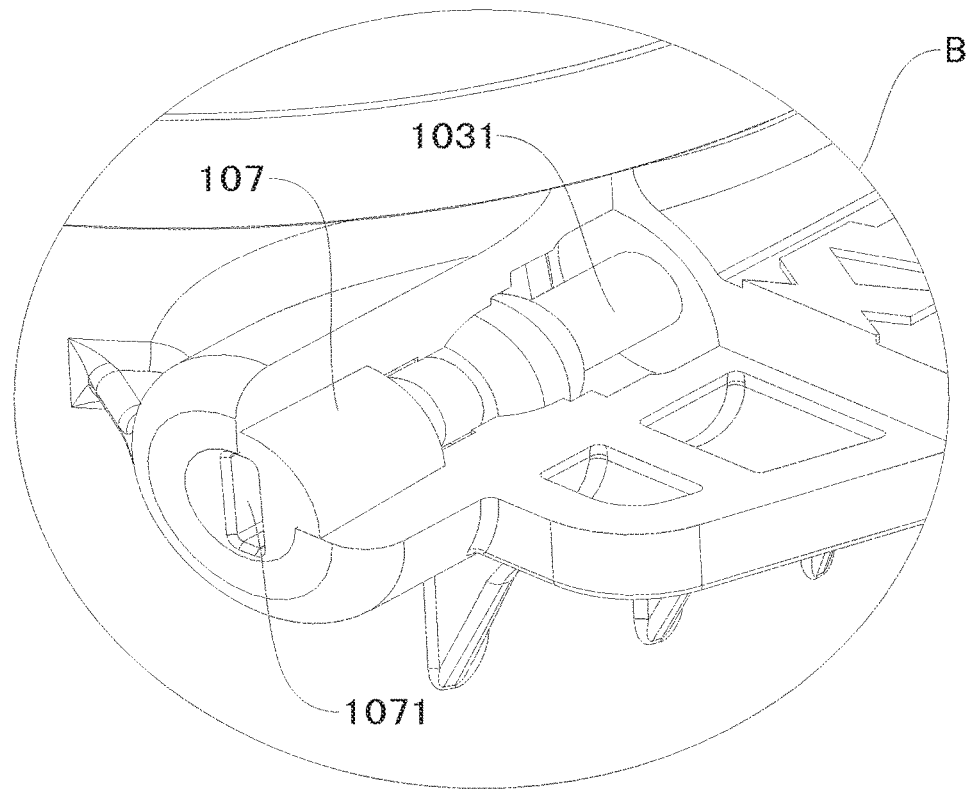
FIG. 6 is an enlarged view of portion B in FIG. 5.
Figure 7:
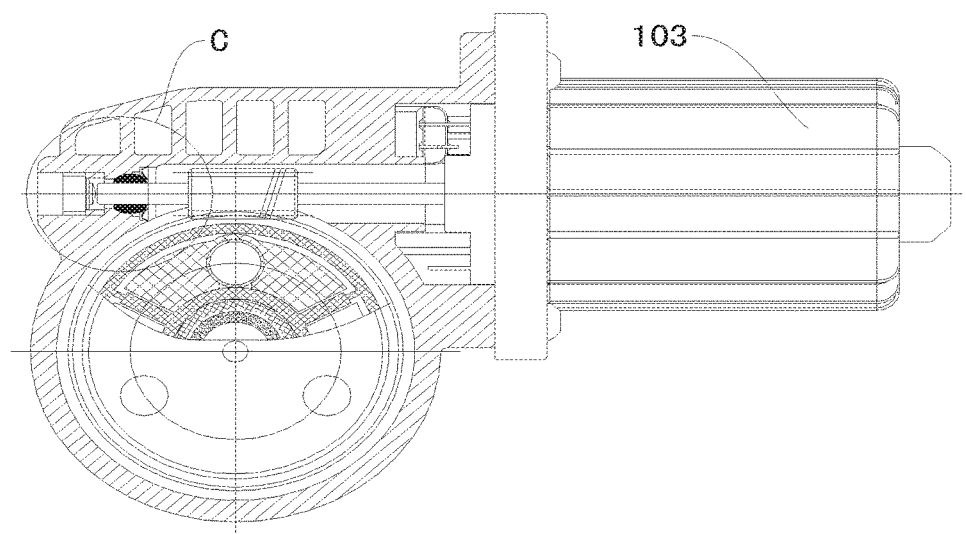
FIG. 7 is a schematic view of a motor assembly of a vehicle step apparatus according to an embodiment of the present invention.
Figure 8:
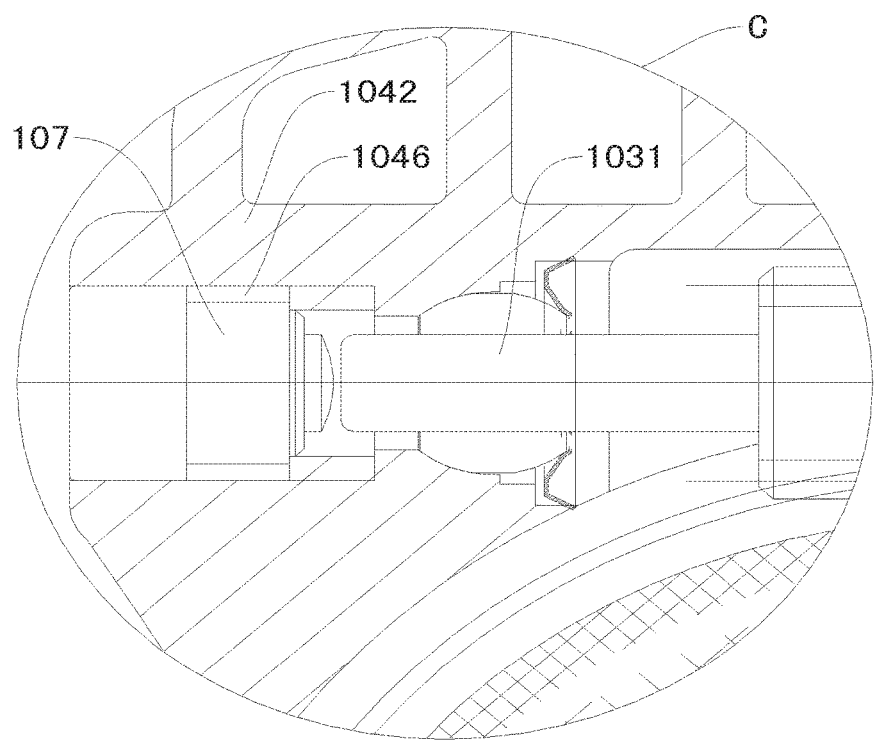
FIG. 8 is an enlarged view of portion C in FIG. 7.

As shown in FIG. 4, the gear box 104 includes a box body 1042, a first cover 1043 and a second cover 1044. The box body 1042 has the cavity 1041 therein, and the cavity 1041 has an open first end (i.e., an open lower end) and an open second end (i.e., an open upper end) opposite to the first end. The first cover 1043 is mounted on the box body 1042 and covers the first end of the cavity 1041. The second cover 1044 is mounted on the box body 1042 and covers the second end of the cavity 1041.

A first seal ring 10451 is disposed between the box body 1042 and the first cover 1043, and a second seal ring 10452 is disposed between the box body 1042 and the second cover 1044. Thus, the gear box 104 has a more reasonable structure. Moreover, a sealing performance of the gear box 104 can be improved by disposing the first seal ring 10451 between the box body 1042 and the first cover 1043 and disposing the second seal ring 10452 between the box body 1042 and the second cover 1044, so as to prevent external impurities (such as water, sand and soil) from entering the cavity 1041 and further to prevent parts disposed in the cavity 1041 from being damaged.

Consequently, a waterproof performance and a protection level of the motor assembly can be greatly improved, so as to enhance reliability and a working life of the motor assembly in harsh environments. The motor assembly can achieve an IP68 protection level, and thus the vehicle step apparatus 10 and the motor assembly thereof can be used in various kinds of harsh environments, for example river, muddy road, field road, mountain road and so on, so that an application scope and an operation condition of the vehicle step apparatus 10 and the motor assembly thereof are expanded.

An up and down direction is denoted by arrow D in FIG. 4. The up and down direction denoted in FIG. 4 is a predetermined direction so as to describe the vehicle step apparatus 10 and the motor assembly thereof conveniently and may be different from a real up and down direction in the real space.

As shown in FIG. 4, the gear box 104 further includes a mounting stand 1047, and the mounting stand 1047 includes a first annular part 10471 and a second annular part 10472. The first annular part 10471 has an outer edge, and the outer edge of the first annular part 10471 is connected with a wall of the cavity 1041. The second annular part 10472 has a lower edge, and the lower edge of the second annular part 10472 is connected with an inner edge of the first annular part 10471.

Specifically, the second annular part 10472 is disposed in the up and down direction, and the first annular part 10471 is perpendicular to the second annular part 10472.

The second annular part 10472 is fitted over the output shaft 1052, and the worm wheel body 1051 is fitted over the second annular part 10472. The sun gear 1061 is fitted over a portion of the output shaft 1052, and the portion of the output shaft 1052 is below the first annular part 10471 and the second annular part 10472.

It is convenient for both the worm wheel body 1051 and the output shaft 1052 to be steadily mounted by providing the mounting stand 1047. Advantageously, the box body 1042 is integral with the mounting stand 1047. An inner and outer direction is denoted by arrow E in FIG. 4.

As shown in FIG. 4, the gear box 104 further includes a supporting boss 1048, and the supporting boss 1048 has a circular shape and is disposed on an upper surface of the first annular part 10471. The supporting boss 1048 has a center axis coinciding with a center axis of the output shaft 1052. The worm wheel body 1051 is disposed on the supporting boss 1048. Thus, a friction area between the worm wheel body 1051 and the first annular part 10471 is decreased.

In an embodiment of the present invention, as shown in FIG. 4, a bearing 1049 is disposed between the second annular part 10472 and the output shaft 1052. In other words, the bearing 1049 is disposed in the second annular part 10472, and the bearing 1049 is fitted over the output shaft 1052. That is to say, the second annular part 10472 is fitted over the bearing 1049. Thus, a friction force between the second annular part 10472 and the output shaft 1052 is decreased remarkably.

Advantageously, a first groove is formed in one of an inner circumferential surface of the second annular part 10472 and an outer circumferential surface of the bearing 1049, a bulge 10473 is disposed on the other of the inner circumferential surface of the second annular part 10472 and the outer circumferential surface of the bearing 1049, and the bulge 10473 is fitted within the first groove.

Figure 9:
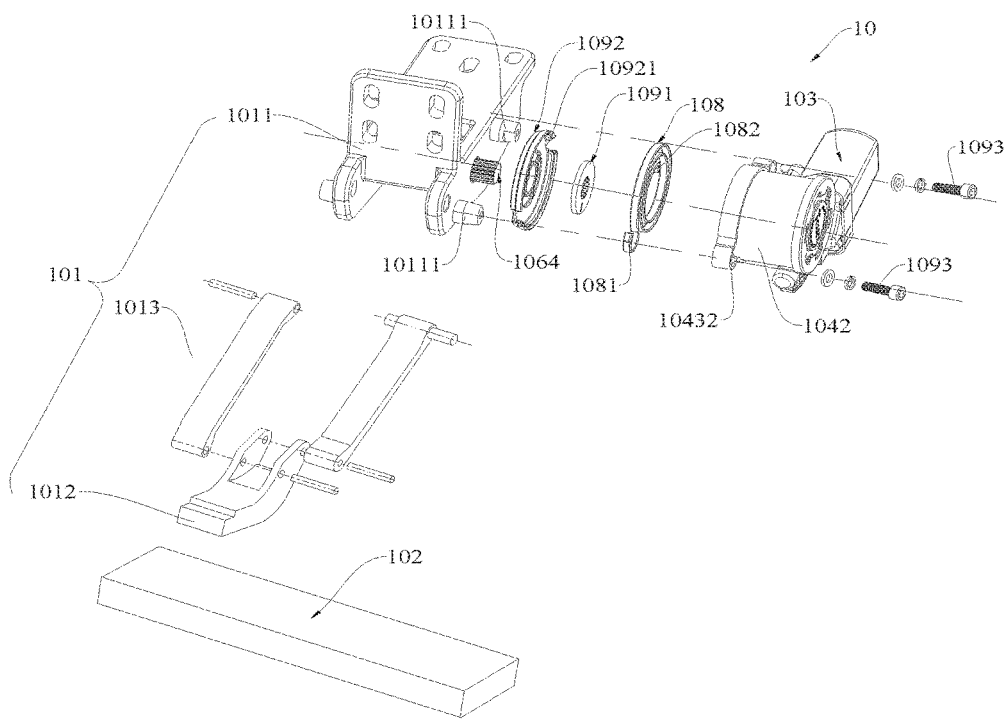
FIG. 9 is an exploded view of a vehicle step apparatus according to an embodiment of the present invention.
Figure 10:
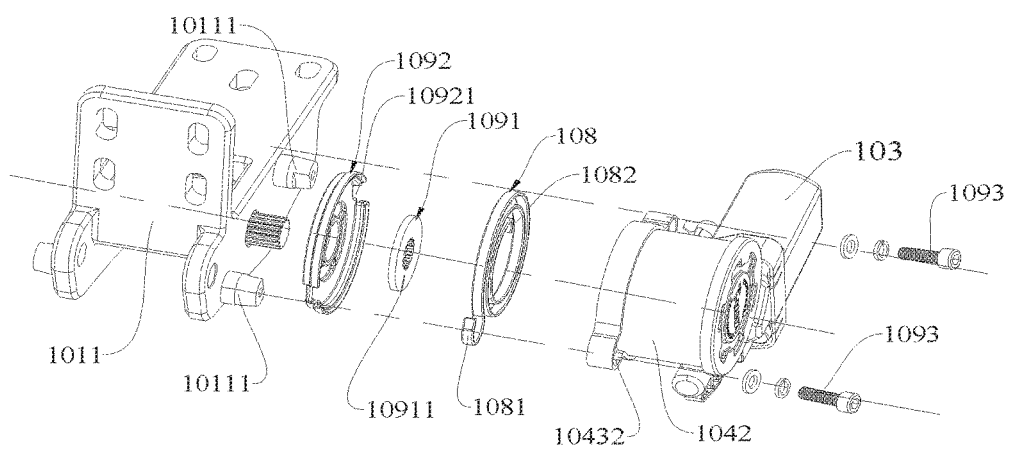
FIG. 10 is a partially exploded view of a vehicle step apparatus according to an embodiment of the present invention.

As shown in FIG. 4, FIG. 9 and FIG. 10, the planet carrier 1062 is connected with the arm assembly 1013 via a connecting shaft 1064. Specifically, a through hole 10431 is formed in the first cover 1043, and a first portion of the planet carrier 1062 is fitted within the through hole 10431. A third seal ring 10453 is disposed between the first portion of the planet carrier 1062 and a wall of the through hole 10431. A mounting hole 10621 is formed in the first portion of the planet carrier 1062, specifically in a lower surface of the first portion, and an end of the connecting shaft 1064 is fitted within the mounting hole 10621.

Moreover, the sealing performance of the gear box 104 can be improved by disposing the third seal ring 10453 between the first portion of the planet carrier 1062 and the wall of the through hole 10431, so as to prevent the external impurities (such as water, sand, and soil) from entering the cavity 1041 and further to prevent the parts disposed in the cavity 1041 from being damaged.

The waterproof performance and the protection level of the motor assembly can be improved, so as to enhance the reliability and the working life of the motor assembly in harsh environments. The motor assembly can achieve the IP68 protection level, and thus the vehicle step apparatus 10 and the motor assembly thereof can be used in various kinds of harsh environments, for example river, muddy road, field road, mountain road and so on, so that the application scope and the operation condition of the vehicle step apparatus 10 and the motor assembly thereof are expanded.

As shown in FIG. 4 to FIG. 8, in some embodiments of the present invention, a threaded hole 1046 is formed in the gear box 104, and the adjusting member 107 is fitted within the threaded hole 1046 via thread connection. Therefore, the adjusting member 107 can be rotated to abut against the free end of the motor shaft 103 when the axial gap of the motor shaft 1031 is increased, so that the axial gap of the motor shaft 1031 can be eliminated.

In an embodiment of the present invention, a second groove 1071 is formed in an end surface, which is far away from the motor shaft 1031, of the adjusting member 107. Thus, the adjusting member 107 can be rotated by a screwdriver inserted into the second groove 1071. Specifically, the adjusting member 107 may be a nut.

As shown in FIG. 9 and FIG. 10, the vehicle step apparatus 10 further includes an elastic member 108. The elastic member 108 elastically deforms so as to store energy when the motor 103 drives the step bracket 1012 to move towards the extending position, and to release energy so as to assist the motor 103 to drive the extending and retracting device 101 when the motor 103 drives the step bracket 1012 to move towards the retracting position.

When the motor shaft 1031 rotates clockwise (or counterclockwise), the motor shaft 1031 drives the elastic member 108 to move and makes the elastic member 108 elastically deformed so as to store energy, and the step 102 is moved from the retracting position to the extending position.

When the motor shaft 1031 rotates counterclockwise (or clockwise), the elastic member 108 restores and releases energy so as to assist the motor 103 to drive the extending and retracting device 101 to retract. Consequently, both a load and an operating current of the motor 103 are decreased when the motor shaft 1031 rotates counterclockwise (or clockwise), so that the operating current of the motor 103 in a process of driving the extending and retracting device 101 to extend approximately equals the operating current of the motor 103 in a process of driving the extending and retracting device 101 to retract, thus effectively protecting the motor 103 and prolonging the working life of the motor 103.

More specifically, the mounting bracket 1011 is mounted on a vehicle body of the vehicle, for example, the mounting bracket 1011 is mounted on a chassis of the vehicle. At least one arm of the arm assembly 1013 is pivotably connected with the mounting bracket 1011, and at least one arm of the arm assembly 1013 is pivotably connected with the step bracket 1012.

The connecting shaft 1064 is connected with an arm of the arm assembly 1013 so as to drive the arm assembly 1013 to move, and thus to drive the step bracket 1012 connected with the arm assembly 1013 to move.

In other words, the motor shaft 1031 drives the arm assembly 1013 to move via the connecting shaft 1064. Thus, the motor 103 can drive the extending and retracting device 101 to extend and retract by rotating clockwise and counterclockwise respectively.

Further, the elastic member 108 includes a scroll spring. The scroll spring has a first end 1081 and a second end 1082.

The first end 1081 of the scroll spring is fixed, and the second end 1082 of the scroll spring is driven by the motor shaft 1031 so as to twist.

Specifically, as shown in FIG. 9 and FIG. 10, the elastic member 108 is a scroll spring. An end of an outermost ring of the scroll spring is bent outwards so as to form the first end 1081, and an end of an innermost ring of the scroll spring is bent inwards so as to form the second end 1082. Thus, the first end 1081 includes the end of the outermost ring of the scroll spring and a portion of the outermost ring which is connected with the end of the outermost ring, and the second end 1082 includes the end of the innermost ring of the scroll spring and a portion of the innermost ring which is connected with the end of the innermost ring.

When the extending and retracting device 101 is extended, i.e. when the step 102 is extended, the first end 1081 of the scroll spring is fixed, and the second end 1082 of the scroll spring rotates along with the motor shaft 1031 and thus is tightly twisted to store energy.

When the extending and retracting device 101 is retracted, i.e. when the step 102 is retracted, the first end 1081 of the scroll spring is fixed, and the second end 1082 of the scroll spring rotates along with the motor shaft 1031 so as to restore and release energy, thus assisting in driving the extending and retracting device 101 to retract. In addition, by adopting the scroll spring, the elastic member 108 has a simple and compact structure, and is easy to mount.

Additionally, the present invention is not limited to this, and the elastic member 108 may be an elastic sheet, a disc spring or another member capable of being elastically deformed.

Furthermore, those skilled in the related art may choose a suitable scroll spring based on a difference between the load of the motor 103 in the process of driving the step 102 to extend and the load of the motor 103 in the process of driving the step 102 to retract, so that the load of the motor 103 in the process of driving the step 102 to extend and the load of the motor 103 in the process of driving the step 102 to retract can be better balanced by the scroll spring.

As shown in FIG. 9 and FIG. 10, in an embodiment of the present invention, the vehicle step apparatus 10 further includes a cover 1092 and a connecting plate 1091. A recess is formed in the first cover 1043 of the gear box 104, and the cover 1092 covers the recess to define an accommodating space. The connecting plate 1091 is mounted in the accommodating space and driven by the motor shaft 1031 to rotate. The scroll spring is mounted within the accommodating space, the first end 1081 of the scroll spring is fixed in the cover 1092, and the second end 1082 of the scroll spring is connected with the connecting plate 1091.

Specifically, the connecting plate 1091 is a substantially circular plate. The connecting plate 1091 is disposed in the accommodating space, and has a first end surface opposite to the recess and a second end surface opposite to the cover 1092. The connecting plate 1091 is indirectly connected with the motor shaft 1031 (as the connecting plate 1091 may be directly connected with the connecting shaft 1064 which is indirectly connected with the motor shaft 1031) and is driven by the motor shaft 1031 to rotate.

The scroll spring is fitted over the connecting plate 1091, and the second end 1082 of the scroll spring is connected with the connecting plate 1091 and rotates along with the connecting plate 1091 in a same direction.

Thus, since the scroll spring is integrated in the motor assembly of the vehicle step apparatus 10, a transmission loss is decreased and the vehicle step apparatus 10 has a more compact entire structure.

As shown in FIG. 9 and FIG. 10, in some embodiments, the cover 1092 is detachably fastened to the first cover 1043 of the gear box 104.

A position limiting notch 10921 is formed in the cover 1092, a position limiting column 10111 is formed on the mounting bracket 1011, and the position limiting column 10111 is fitted in the position limiting notch 10921 to mount the cover 1092 to the mounting bracket 1011. The first end 1081 of the scroll spring is fitted over the position limiting column 10111.

As shown in FIG. 9 and FIG. 10, the recess is formed in an end surface, which is facing the mounting bracket 1011, of the first cover 1043 of the gear box 104. The cover 1092 includes a cover body and a flange connected with an edge of the cover body. An inner wall of the flange has a stepped positioning surface, and the cover 1092 covers the recess via the stepped positioning surface. The position limiting notch 10921 extends inwards from an edge of the cover 1092.

The position limiting column 10111 is formed on a side surface of the mounting bracket 1011 opposite to the gear box 104, and a clamping groove fitted with the position limiting notch 10921 is formed in the position limiting column 10111. Specifically, two position limiting columns 10111 are provided, and bottom surfaces of the clamping grooves of the two position limiting columns 10111 force the cover 1092 to abut against the first cover 1043 of the gear box 104, so as to limit a position of the cover 1092 in the axial direction. Side surfaces of the clamping grooves of the two position limiting columns 10111 limit the position of the cover 1092 in both a radial direction and a circumferential direction. The first end 1081 of the scroll spring extends out of the position limiting notch 10921 and is fitted over the position limiting column 10111.

Thus, the cover 1092, the first cover 1043 of the gear box 104 and the mounting bracket 1011 are fixedly connected together, and a suitable position is provided to fix the first end 1081 of the scroll spring, so that a torsional deformation of the scroll spring is decreased during mounting and using thereof.

It may be understood by those skilled in the related art that the cover 1092, the connecting plate 1091 and the recess each may have a circular shape, an oval shape and so on. The number of the position limiting notches 10921 and the number of the position limiting columns 10111 each is not limited to two, and when the number of the position limiting notches 10921 is more than two, the multiple position limiting notches 10921 are evenly arranged and spaced apart from one other along a circumferential direction of the cover 1092.

Advantageously, an inserting slot 10911 is formed in an outer circumferential surface of the connecting plate 1091, and the second end 1082 of the scroll spring is inserted into and fitted within the inserting slot 10911.

As shown in FIG. 9 and FIG. 10, the inserting slot 10911 extends inwards from an outer edge of the connecting plate 1091, and the inserting slot 10911 extends along a radial direction of the connecting plate 1091.

A center of the connecting plate 1091 has a spline hole, and the connecting shaft 1064 has an external spline, so that the connecting plate 1091 can be fitted over and connected with the connecting shaft 1064 by a spline fit between the spline hole and the external spline, thereby ensuring the power transmission and providing convenient assembling and disassembling. Further, the connecting shaft 1064 is connected with the arm of the arm assembly 1013, and passes through the mounting bracket 1011. Thus, the motor shaft 1031 drives the connecting shaft 1064 and the connecting plate 1091 to rotate, and the second end 1082 of the scroll spring fixed to the connecting plate 1091 is also rotated along with the connecting plate 1091, so that the scroll spring is twisted tightly.

As shown in FIG. 9 and FIG. 10, in an embodiment of the present invention, a mounting hole 10432 is formed in the first cover 1043 of the gear box 104, and the position limiting column 10111 passes through the mounting hole 10432. A threaded hole is formed in the position limiting column 10111, and the gear box 104 is mounted to the mounting bracket 1011 via a bolt 1093 fitted within the threaded hole.

Specifically, the position limiting column 10111 passes through the position limiting notch 10921 and abuts against the first cover 1043 of the gear box 104. The mounting hole 10432 of the first cover 1043 of the gear box 104 is in one-to-one correspondence with the threaded hole of the position limiting column 10111, and the bolt 1093 passes through the mounting hole 10432 and is screwed into the threaded hole so as to fix the first cover 1043 of the gear box 104 to the mounting bracket 1011. Thus, since the first cover 1043 of the gear box 104 is fixed to the mounting bracket 1011 via the bolt 1093, it is easy to replace and maintain the scroll spring.

In addition, the present invention is not limited to this, and the first cover 1043 of the gear box 104 may be fixed with the mounting bracket 1011 via welding or other suitable manners.

A motor assembly of the vehicle step apparatus 10 is also provided in the present application. As shown in FIG. 1 to FIG. 10, the motor assembly of the vehicle step apparatus 10 includes a motor 103, a gear box 104, a worm wheel 105, a sun gear 1061, a planet carrier 1062, a planet gear 1063 and an adjusting member 107.

The motor 103 has a motor shaft 1031 configured as a worm. In other words, a helical gear is formed in at least a portion of the motor shaft 1031. The gear box 104 has a cavity 1041 therein, and at least a portion of the motor shaft 1031 is inserted into the cavity 1041. The adjusting member 107 is mounted in the gear box 104, movable in an axial direction of the motor shaft 1031 and abuts against a free end of the motor shaft 1031.

The worm wheel 105 is rotatably disposed in the cavity 1041, and includes a worm wheel body 1051 and an output shaft 1052. The worm wheel body 1051 meshes with the motor shaft 1031, and the output shaft 1052 is mounted to the worm wheel body 1051. The sun gear 1061 is fitted over the output shaft 1052.

The planet carrier 1062 is rotatably disposed in the cavity 1041 and connected with the arm assembly 1013 to drive the arm assembly 1013, further to drive the step bracket 1012 to move between the extending position and the retracting position. The planet gear 1063 is rotatably mounted to the planet carrier 1062 and meshes with the sun gear 1061.

Thus, the motor assembly of the vehicle step apparatus 10 according to embodiments of the present invention has advantages of high transmission efficiency, low noise during reversal, a compact structure, a small size, high safety, high reliability, a long working life, a low manufacture cost and so on, and is suitable to be mounted at a bottom of a vehicle, in which the bottom of the vehicle has a narrow space.

Reference throughout this specification to "an embodiment," "some embodiments", "an example", "a specific example", or "some examples", means that a particular feature, structure, material, or characteristic described in connection with the embodiment or example is included in at least one embodiment or example of the present invention.

The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A vehicle step apparatus, comprising:
    an extending and retracting device comprising a mounting bracket, a step bracket, and an arm assembly that is connected between the mounting bracket and the step bracket and drives the step bracket to move between an extending position and a retracting position;
    a step mounted on the step bracket;
    a motor that has a motor shaft configured as a worm;
    a gear box defining a cavity therein, at least a portion of the motor shaft being inserted into the cavity;
    a worm wheel rotatably disposed in the cavity, and comprising a worm wheel body meshing with the motor shaft and an output shaft mounted to the worm wheel body;
    a sun gear fitted over the output shaft;
    a planet carrier rotatably disposed in the cavity and connected with the arm assembly to drive the arm assembly;
    a planet gear rotatably mounted to the planet carrier and meshing with the sun gear; and
    an adjusting member mounted in the gear box, movable in an axial direction of the motor shaft and abutting against a free end of the motor shaft.

2. The vehicle step apparatus as set forth in claim 1, wherein the gear box comprises:
    a box body defining the cavity therein, the cavity defining an open first end and an open second end opposite to the first end;
    a first cover mounted on the box body and covering the first end,
    a first seal ring disposed between the box body and the first cover; and
    a second cover mounted on the box body and covering the second end,
    a second seal ring disposed between the box body and the second cover.

3. The vehicle step apparatus as set forth in claim 2, wherein the gear box further comprises a mounting stand which comprises:
    a first annular part having an outer edge connected with a wall of the cavity; and
    a second annular part fitted over the output shaft and having a lower edge connected with an inner edge of the first annular part, the worm wheel body being fitted over the second annular part, and the sun gear being fitted over a portion of the output shaft which is below the first annular part and the second annular part.

4. The vehicle step apparatus as set forth in claim 3, wherein the gear box further comprises a supporting boss that has a circular shape, is disposed on an upper surface of the first annular part and defines a center axis coinciding with a center axis of the output shaft, and the worm wheel body is disposed on the supporting boss.

5. The vehicle step apparatus as set forth in claim 3, further comprising a bearing disposed in the second annular part and fitted over the output shaft.

6. The vehicle step apparatus as set forth in claim 5, wherein a first groove is formed in one of an inner circumferential surface of the second annular part and an outer circumferential surface of the bearing, and
    wherein a bulge is disposed on the other of the inner circumferential surface of the second annular part and the outer circumferential surface of the bearing, and fitted within the first groove.

7. The vehicle step apparatus as set forth in claim 2, wherein the planet carrier is connected with the arm assembly via a connecting shaft.

8. The vehicle step apparatus as set forth in claim 7, wherein a through hole is formed in the first cover, and a first portion of the planet carrier is fitted within the through hole,
    wherein a third seal ring is disposed between the first portion of the planet carrier and a wall of the through hole,
    wherein a mounting hole is formed in the first portion of the planet carrier, and an end of the connecting shaft is fitted within the mounting hole.

9. The vehicle step apparatus as set forth in claim 1, wherein a threaded hole is formed in the gear box, and the adjusting member is fitted within the threaded hole via thread connection,
    wherein a second groove is formed in an end surface, which is far away from the motor shaft, of the adjusting member.

10. The vehicle step apparatus as set forth in claim 1, further comprising an elastic member that elastically deforms so as to store energy when the motor drives the step bracket to move towards the extending position, and to release energy so as to assist the motor to drive the extending and retracting device when the motor drives the step bracket to move towards the retracting position.

11. The vehicle step apparatus as set forth in claim 10, wherein the elastic member comprises a scroll spring, and the scroll spring defines a fixed first end and a second end that is driven by the motor shaft so as to twist.

12. A motor assembly of a vehicle step apparatus, comprising:
    a motor having a motor shaft configured as a worm;
    a gear box defining a cavity therein, at least a portion of the motor shaft being inserted into the cavity;
    a worm wheel that is rotatably disposed in the cavity, and has a worm wheel body meshing with the motor shaft and an output shaft mounted to the worm wheel body;
    a sun gear fitted over the output shaft;
    a planet carrier rotatably disposed in the cavity and connected with the arm assembly to drive the arm assembly;
    a planet gear rotatably mounted to the planet carrier and meshing with the sun gear; and
    an adjusting member mounted in the gear box, movable in an axial direction of the motor shaft and abutting against a free end of the motor shaft.

* * * * *